(12) United States Patent
Kochunni et al.

(10) Patent No.: US 7,457,790 B2
(45) Date of Patent: Nov. 25, 2008

(54) EXTENSIBLE CONFIGURATION ENGINE SYSTEM AND METHOD

(75) Inventors: Jaidev O. Kochunni, Eatontown, NJ (US); Michael F. Klose, Eatontown, NJ (US); Anand Prahlad, East Brunswick, NJ (US); Rajiv Kottomtharayil, Marlboro, NJ (US); Parag Gokhale, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 11/313,268

(22) Filed: Dec. 19, 2005

(65) Prior Publication Data

US 2007/0143238 A1 Jun. 21, 2007

(51) Int. Cl.
*G06F 7/00* (2006.01)
*G06F 17/30* (2006.01)
(52) U.S. Cl. .............................. 706/45; 707/1
(58) Field of Classification Search .................. 706/45; 707/1
See application file for complete search history.

(56) References Cited

U.S. PATENT DOCUMENTS

| 4,464,122 | A | * | 8/1984 | Fuller et al. ................. 434/262 |
|---|---|---|---|---|
| 4,686,620 | A | | 8/1987 | Ng |
| 4,995,035 | A | | 2/1991 | Cole et al. |
| 5,005,122 | A | | 4/1991 | Griffin et al. |
| 5,093,912 | A | | 3/1992 | Dong et al. |
| 5,133,065 | A | | 7/1992 | Cheffetz et al. |
| 5,193,154 | A | | 3/1993 | Kitajima et al. |
| 5,212,772 | A | | 5/1993 | Masters |
| 5,226,157 | A | | 7/1993 | Nakano et al. |
| 5,239,647 | A | | 8/1993 | Anglin et al. |
| 5,241,668 | A | | 8/1993 | Eastridge et al. |
| 5,241,670 | A | | 8/1993 | Eastridge et al. |
| 5,276,860 | A | | 1/1994 | Fortier et al. |
| 5,276,867 | A | | 1/1994 | Kenley et al. |

(Continued)

FOREIGN PATENT DOCUMENTS

EP 0259912 3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Joseph P. Hirl
*Assistant Examiner*—Nathan H Brown, Jr.
(74) *Attorney, Agent, or Firm*—Perkins Coie LLP

(57) ABSTRACT

Methods and systems are provided for facilitating decision making through an improved recommendation system. The data used in the system, such as the questions and business logic for navigating between questions, is stored in relational database tables that are easy to access and edit by users. A backend application program reads the data and processes the navigation logic depending upon answers received from users to automatically generate a decision tree. Users are allowed to select questions earlier in the tree, and the application can regenerate a tree from the point of the selected question and on. The application program stores the questions to be presented in a structured document which is handed off to a user interface generation program.

19 Claims, 7 Drawing Sheets

U.S. PATENT DOCUMENTS

| | | |
|---|---|---|
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 2001/0034771 A1* | 10/2001 | Hutsch et al. ............... 709/217 |
| 2002/0138462 A1* | 9/2002 | Ricketts ..................... 707/1 |
| 2003/0126250 A1* | 7/2003 | Jhanji ...................... 709/223 |
| 2007/0166674 A1 | 7/2007 | Kochunni et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

\* cited by examiner

EXTENSIBLE CONFIGURATION ENGINE SYSTEM AND METHOD

RELATED APPLICATIONS

This application is related to the following pending applications, each of which is hereby incorporated herein by reference in its entirety:

application Ser. No. 09/354,058, titled Hierarchical Backup And Retrieval System, filed Jul. 15, 1999;

application Ser. No. 10/818,749, titled System And Method For Dynamically Performing Storage Operations In A Computer Network, filed Apr. 5, 2004;

application Ser. No. 60/519,540, titled System And Method For Performing Integrated Storage Operations, filed Nov. 13, 2003;

application Ser. No. 60/567,178, titled Hierarchical System And Method For Performing Storage Operations In A Computer Network, filed Apr. 30, 2004;

application Ser. No. to be assigned, titled System And Method For Performing Multistream Storage Operations, filed Nov. 7, 2005;

application Ser. No. to be assigned, titled System And Method To Support Single Instance Storage Operations, filed Nov. 7, 2005;

application Ser. No. to be assigned, titled Method And System Of Pooling Storage Devices, filed Nov. 7, 2005;

application Ser. No. to be assigned, titled Method And System For Selectively Deleting Stored Data, filed Nov. 7, 2005;

application Ser. No. to be assigned, titled Systems And Methods For Recovering Electronic Information From A Storage Medium, filed Nov. 7, 2005;

application Ser. No. to be assigned, titled Method And System For Monitoring A Storage Network, filed Nov. 7, 2005; and application Ser. No. to be assigned, titled Systems And Methods For Generating Configuration Metrics In A Storage Network, filed Dec. 19, 2005.

COPYRIGHT NOTICE

A portion of the disclosure of this patent document contains material which is subject to copyright protection. The copyright owner has no objection to the facsimile reproducton by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to automated recommendation systems and, more particularly, to improved methods for generating decision trees and for allowing more flexible navigation of same by users.

Users or purchasers of complex software systems are often called upon to make difficult decisions. These include such issues as what and how many software components they need or otherwise should license, how and where to install those components, and how to configure the installed components for optimal benefit. Two typical sources of assistance in making these decisions are customer service representatives of the software vendor and documentation provided by the vendor. Customer service representatives have to be thoroughly trained to provide proper assistance and need to be available to assist when the user desires it. Documentation is often very lengthy and is necessarily non-customized for each particular user's needs. Either way, both methods are time consuming and prone to some errors or, at the very least, result in non-optimal decisions.

Wizards, templates, expert systems, and similar software tools are sometimes employed to assist users in installing or configuring a software system. These tools are developed in advance by programmers and walk users through a process by asking for certain information and reaching conclusions or taking action based on the answers users provide to these questions. The conclusions reached or actions taken are pre-programmed into the software tool, as are the sequence in which the questions are presented to users.

Such wizards are useful in walking users through a simple process. However, for more complex processes which have many permutations that are dependent upon answers provided by users, such wizards or tools are too difficult to preprogram or are otherwise inadequate. In addition, such wizards are not designed to allow users to change the conclusions based on changes to some answers already provided without redoing the entire decision making process and re-presenting all the questions from the beginning. Thus, for example, a wizard designed to assist a user in installing a complex software system on a network would ask a series of questions related to the configuration of the network upon which the software is to be installed. However, should the configuration change, a user would typically be required to re-run the entire wizard and provide all the network configuration data all over again.

In addition, such wizards or expert systems are preprogrammed by the vendors who supply the software to be installed or configured. As a result, they do not easily allow a mechanism for an administrator within an organization to customize the tool for his or her own organization.

As a result, there is a need for improved software tools that simplify a decision making process, facilitate better decision making in the event of changed circumstances, and allow greater flexibility to system administrators.

BRIEF SUMMARY OF THE INVENTION

The present invention includes methods and systems for facilitating decision making through an improved recommendation system. The data used in the system, such as the questions and business logic for navigating between questions, may be stored in relational database tables that are easy to access and edit by users. A backend application program reads the data and processes the navigation logic depending upon answers received from users to automatically generate a decision tree. Users are allowed to select questions earlier in the tree, and the application can regenerate a tree from the point of the selected question and on. The application program stores the questions to be presented in a structured document which is handed off to a user interface generation program.

In one embodiment of the invention, a computerized method is provided for facilitating decision making by presenting questions to and receiving answers from a user. The method involves storing one or more user-editable question tables containing a plurality of questions and navigation logic data for navigating between questions; and maintaining one or more dynamic tables containing question history data identifying which of the questions have been presented in a decision making session and answer data identifying answers received from the user. At a given point in a decision making session, one or more questions are selected to present based on the question history data and the navigation logic data, and a structured document like an XML file is generated containing the one or more questions determined to be presented. The structure document is used to generate a user interface for presenting the one or more questions and receiving the answers.

The user-editable question tables may include one or more tables, such as a table containing the plurality of questions, another table including question options, and yet another table containing the navigation logic data. A first question table may contain question type data. A second question table may include expected answers or question options for each question in the first table. The first and second tables (which may also be one table or more than two tables) may also store profile link data identifying groups of entities to which questions relate and the dynamic tables maintain separate question history data for different groups of entities based on the profile link data. For example, profile links may be created for particular standard system types, or component types, etc., such as MICROSOFT FILE SYSTEM, MICROSOFT EXCHANGE servers, SQL servers, or other system types or component types. In some embodiments, the user-editable question tables store, in the navigation logic data, jump question data identifying one or more jump questions to be presented after a given question and call question data identifying one or more questions to be presented before the given question.

Another table, such as an expression table, may be stored containing expression data including a plurality of expression data components and one or more expression operators linking the expression data components, the expression data evaluating an expression as true or false based on any of the answers, or may evaluate integers, string values, or other response values. The dynamic tables may then store a link to an expression data entry in the expression table, and the step of determining which one or more questions to present includes determining whether the expression corresponding to the linked expression data entry evaluated to true or false or some other value.

In accordance with aspects of the invention, users are allowed to select a question previously presented during the decision making session to be presented again at any point during the decision making session. The navigation logic data may be used to determine which one or more questions to present before or after the user's selected, previously presented question. This may be done by comparing an answer received in response to the previously presented question to a second answer received for the same question presented based on the user selection and determining which question to present based on whether the first answer is the same as the second answer.

In accordance with another aspect of the invention, a computerized method is provided for facilitating decision making. The method involves presenting, in a user interface, a decision tree representing a series of information requests presented to a user as part of a decision making session, and presenting the information requests to the user in a sequence provided by the decision tree. Information is received from the user in response to at least some of the presented information requests. The user is allowed to select a first information request in the decision tree that has already been presented in the decision making session. The user provides the first information in response to the selected first information request. It is then determined whether the first information received from the user results in a change to the decision tree, and the decision tree is modified based on the first information.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of preferred embodiments, reference is made to the accompanying drawings that form a part hereof, and in which are shown by way of illustration embodiments in which the invention may be practiced. It is to be understood that other embodiments may be utilized and procedural and structural changes may be made without departing from the scope of the present invention.

The present invention provides recommendation methods and systems for improved automated decision making. The use of this invention is not limited to any particular subject of the decision making, although the invention is well suited to making decisions with respect to purchase, installation or configuration of a software system in a complex, dynamic environment such as a large network. An example of such a system is a storage system used, for example, to perform storage operations such as backups, archives and restores of data on a network. Such storage systems are offered by the assignee of the present invention, Commvault Systems of Oceanport, N.J., and are further described in the commonly owned patent applications referenced above.

Figure 1:
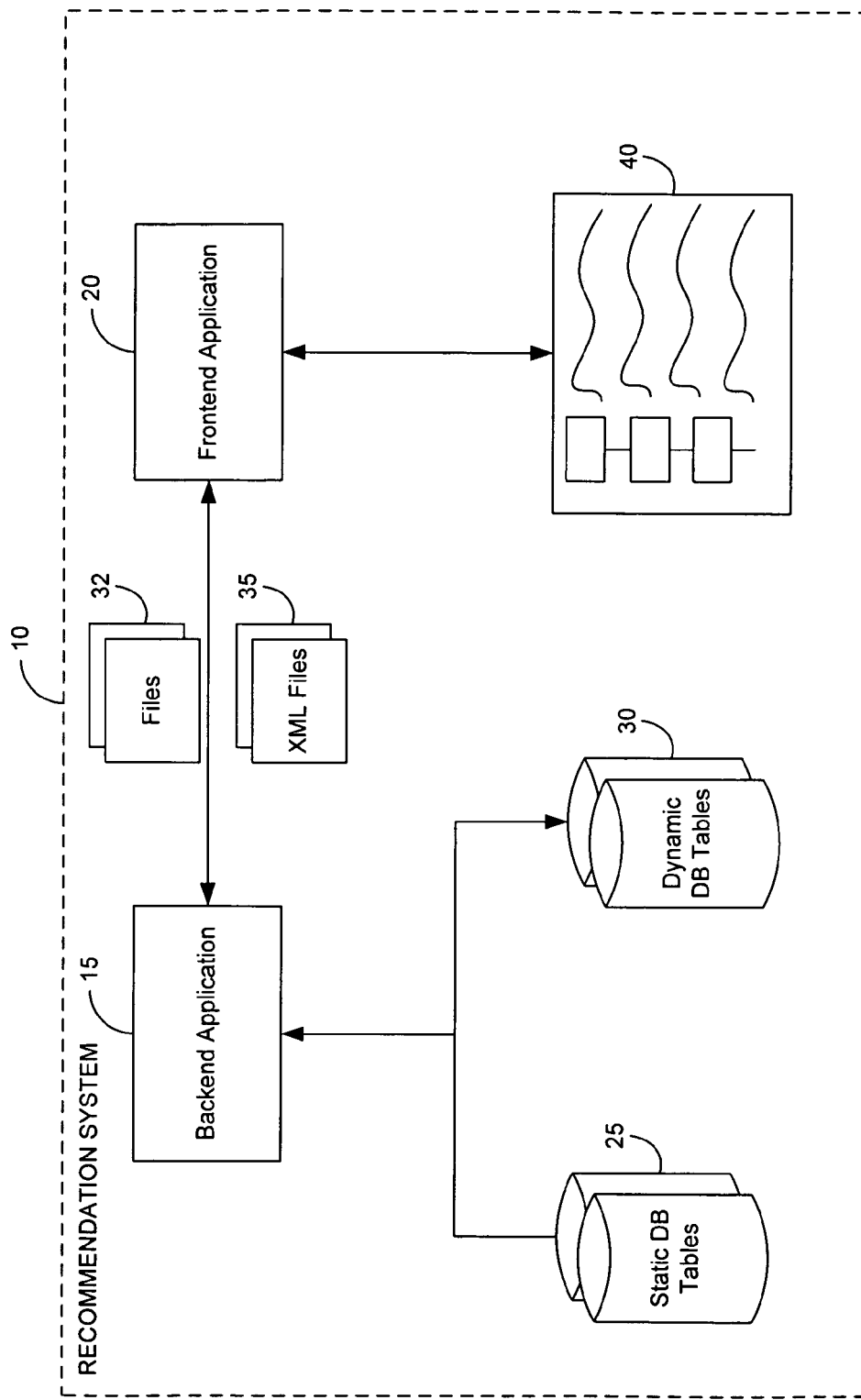
FIG. 1 is a block diagram representing a decision making system in accordance with one embodiment of the present invention.

Referring to FIG. 1, a recommendation system 10 in accordance with embodiments of the invention includes a number of discrete software and data components which interoperate to present information requests to users, receive responses to those requests, and make recommendations based on the responses. The software components in the recommendation system 10 are split between a backend application 15 and a front end application 20. At a high level, the backend application 15 is programmed to process the decision making data and the front end application 20 is programmed to generate a user interface and to interact with a user. The data for the recommendation system 10 is stored in a set of static database tables 25 and a set of dynamic database tables 30. The data may be stored, for example, in a computer readable medium or other data components know in the art. As described in greater detail below, the static tables 25 contain questions to be presented, business logic used in navigating between questions, expression data used in evaluating responses, recommendation data used in making decisions based on the evaluated expressions, and profile data used to profile certain types of elements for common questioning or recommendations. As used herein, questions include any type of request for information, regardless of whether the request is phrased in the form of a question. The dynamic tables 30 contain dynamic data used during a decision making session, to keep track of questions already presented, questions to be presented, and answers received. As used herein, a decision making session generally connotes a logical relationship among a set of questions being presented, and is not intended to connote or require any temporal relationship between the questions or any other technical requirement for connecting the questions.

In operation, the backend application 15 reads the data from the static database tables 25 and establishes decision tree data which it stores in one or more files 32 which may be communicated using a socket protocol, or alternatively, the data may be stored in XML files 35, or other files. Among other things, as explained further below, the files 32 and XML files 35 contain data on questions to be presented and the navigational relationship between the questions. The backend application 15 provides the files 32 or XML files 35 to the front end application 20. The front end application 20 includes instruction code for reading the data in the files 32 or XML files 35 and automatically generating a graphical user interface (GUI) 40 to present the questions provided in the files 32 or XML files 35 and to receive answers to the questions. The files 32 or XML files 35 contain some questions to be presented for a given session, and the answers to the questions received through the GUI 40 are handed off to the backend application 15. The backend application 15 stores the answers in the dynamic tables 30 and determines what questions to navigate to next based on the answers and the navigational data stored in the static tables 25. The backend application 15 also processes the answers to obtain recommendations for decisions, as explained further below.

In some embodiments, the generated GUI 40 also displays a decision tree graphical image, as represented in FIG. 1, that shows the user the sequence of questions that have been presented so far at any given point in the process. The decision tree image is built by the front end application 20 by reading the data in the files 32 or XML files 35. The GUI 40 allows the user to choose to answer the next presented question, or to select a previously presented question in the decision tree and to provide an updated answer where an answer had already been provided or to provide an answer when no answer had been provided.

The use of the XML file format allows for the GUI 40 to be generated using a variety of application types. For example, conventional Java tools such as Java Server Faces technology available from Sun Microsystems may be used to parse the XML files 35, retrieve the questions and other data components, and generate an appropriate user interface to present those components using styles selected by an administrator. One skilled in the art will recognize that other file formats may and other GUI generation technology may be used for the same purpose and are within the intended scope of the present invention.

Figure 2:
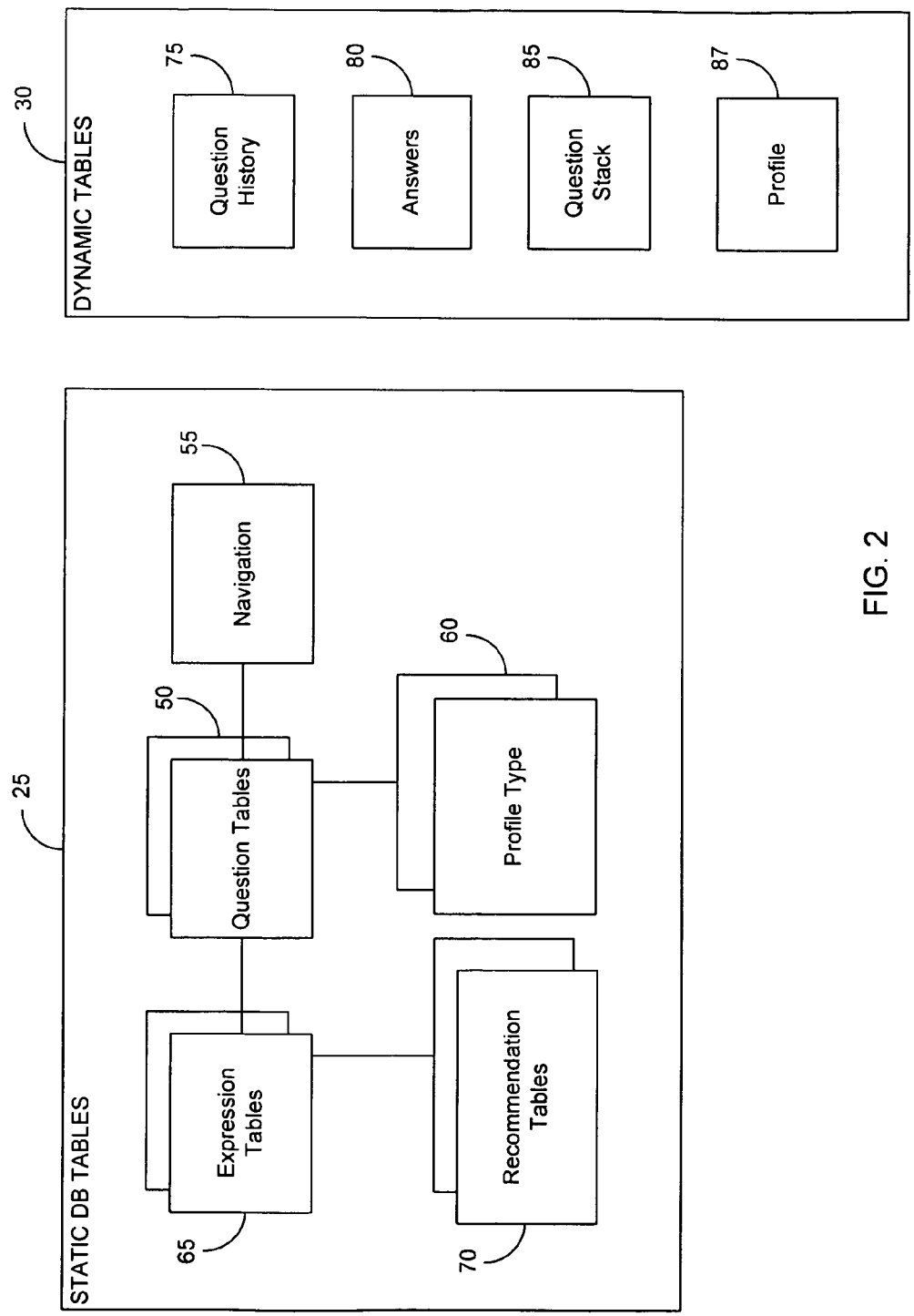
FIG. 2 is a representation of database tables employed in the system of FIG. 1 in accordance with one embodiment of the present invention.

A more detailed breakdown of the type of tables that are in the static database tables 25 and dynamic database tables 30 is shown in FIG. 2. These tables may form part of any conventional relational database, such as a SQL database, e.g., SQLLite or MySQL. The static tables 25 include one or more question tables 50 for storing questions and data associated therewith such as answers or options associated with questions, one or more question navigation tables 55 for storing navigation logic used in generating the decision tree, one or more profile tables 60 used in allowing users to link together types of elements based on a common profile, one or more expression tables 65 for storing logic used in evaluating the answers to facilitate further question navigation and recommendations, and one or more recommendation tables 70 for storing recommendation data. The static tables 25 are populated by data provided by a software vendor or by an administrator, and are not changed by the decision tree generation process.

The dynamic tables 30 include one or more question history tables 75 for tracking what questions have been presented at any given point in a decision making session, one or more answer tables 80 for storing answers received from users, one or more question stack tables 85 for managing the question navigation decisions, and one or more profile tables 87, as explained further below. The dynamic tables 30 are populated by the backend application 15 during a decision making session, and are used by the backend application to select questions to present at any given point and to make recommendations.

Specific embodiments of tables used in the present invention are now described. In some embodiments, the question tables 50 include a questions table and question options or question answer table. Questions, including question text, may be stored in the questions table. The question table contains a question identifier, question text, a question link text which is a one or two word summary of the question to display in a question history list as described below, the question type or other question related fields. Table fields described herein are exemplary and persons of skill in the art may recognize that fewer or additional fields may be used to provide the systems and methods described herein. The question type represents the type of question and what type of answer is appropriate for it. For example, the question type may include a list of options (perhaps presented as radio buttons to the GUI), yes/no, numeric or string entries, and a concept of profile links which will be explained later. Each question in the questions table generally has at least one question option or answer. In most cases, there are multiple answers to choose from. The question option (or answer) table stores a question option identifier (which may serve as the primary key for the table), an associated question identifier, an expression identifier (e.g., whether the option is active or not, whether an expression whether an option should be displayed or not), a profile link question identifier, or other field relating to a question option. The question identifier may be used to link entries or records in the question option table with a one or more records in the question table. For example a first question is linked to an entry for question options to the first question. The expression identifier may be used to link a record or entry in the question option table with one or more records in the expression tables 65 and the profile link identifier may be used to link a record in the question options table with one or more records in a profile table 60, or profile 87, both as explained further below.

In some embodiments, the question navigation tables 55 includes a question navigation table containing the following fields: navigation identifier (which may serve as a primary key for the table), question identifier from which to navigate, expression identifier, a jump question identifier, call question identifier, or other field. The question identifier from which to navigate field generally identifies a question the navigation table record represents logic for navigating from. Generally, the question identifier of the then most recently presented question is used to locate the navigation table record which contains the logic for selecting a next question or questions to present in a GUI. The expression identifier field links a navigation record to a record in the expression table which is used to evaluate an expression based on answers provided to questions presented. If the linked expression is true or otherwise provides a value which indicates that a subsequent question be presented, the backend application 15 selects the jump or call question or questions, as explained further below, identified in the questions table as matching the jump question identifier or call question identifier, respectively. If the expression linked by expression identifier evaluates to false or otherwise provides a value which indicates that a subsequent question be presented, the backend application 15 selects the jump or call question or questions identified in the questions table as matching the jump question identifier or call question identifier appropriate for such scenario.

Generally, jump questions are selected to be next presented to a user, e.g., in a GUI, following which navigation goes, or jumps, to a different navigation record corresponding to the jump question, while call questions are called to be presented without leaving the current navigation record. For example, at a given point in the navigation of a decision tree, one or more call questions are presented first to obtain information which may then be evaluated to determine which jump question or questions to pursue next. The process for using these questions is explained in greater detail below.

In some embodiments, the profile tables 60 include a profile table, a profile links table, and a profile link list table which is generated at runtime. A user may have one object for which he might answer a set of questions one way and another object where he might want to answer some of these questions in a different way. In both cases, the created decision tree may be quite different. Answers for two objects of the same kind should be profiles of the same profile type. The profile tables 60 are used to associate user or system profiles of a certain profile type to a question. For example, a question could be "Please select all objects of object type A where condition C applies" where the user is presented with a list of all profiles created of profile type A and he can choose which profiles of type A apply to the condition. In another example, a user may be presented with a question such as "Please select all server components of brand X in use in your system" or "Please indicate the software modules in use for a particular device in your system," or other question. The information input in response to such profile questions may be stored in a dynamic user profile table, e.g., 87. Such profile information is accessed by the frontend and backend to supply user appropriate questions, question options and recommendations. The profiles selected or input by a user can be useful in determining recommendations, as described further below.

Profile type is a static entity which may have a name and an identifier, e.g., SQL servers, EXCHANGE servers, data agents, or other identifiers. The static profile table typically includes the following fields: profile identifier (which may be a primary key for the table), profile type identifier, profile name, profile quantity, question history identifier, or other field. The question history identifier may be used a user exits the questioning and opens it again for a particular profile so that the questioning starts where the user left off. The profile links table may be used to link profile records stored in the profile table with question records in the questions table and may have fields including: a profile link identifier (which may be the primary key for the table), a profile type identifier to link the table to one or more profile records and to list profiles from, and a flags column. The profile link list table contains a row identifier (which may be a primary key for the table), a profile link identifier, a profile identifier, a linked profile identifier and a number of instances that allow the user to say how many objects or elements have the object type selected, or other fields.

The expression tables 65 include, in some embodiments, an expression table and an expression component table. Generally, expressions use information stored in the dynamic answers (or question options) table 80 and manipulate those answers or options to determine whether certain question options are displayed or not, how to navigate among questions, what recommendations to issue, etc. Whenever an expression may be evaluated in the above cases, an expression identifier is included in the record or table entry to be linked to a record or records in the expression table. Thus, for example, the question navigation table has an expression identifier to link it to one or more expressions it evaluates in deciding which call or jump questions to navigate to. A user profile 87 may be used to further link expressions to be appropriate for a user's particular system configuration. For example, profile data which indicates that a user operates SQL servers, may link to expression table entries relating to SQL servers, and not, for example, ORACLE servers or other servers.

The expression table has an expression identifier field, (which may be the primary key for the table), an expression description field intended to include a descriptive text as to what the expression evaluates (to be used in a question editor), a root expression identifier field, or other field. The root expression identifier may be the expression identifier of the top level expression needed in the case that an expression consists of multiple expressions connected by a Boolean OR operation, or other logical connector.

The actual expression logic is contained in the expression component table. One expression identifier can have multiple expression components, and all expression components for a given expression identifier may be connected via a Boolean AND operation or other logical connector. The expression component table has the following fields: expression component identifier (which may serve as the primary key for the table), expression identifier, which links the records to one or more records in the expression table, an operator, and the following exemplary expression components:

Comp1_QuestionOptionidentifier
Comp1_Expressionidentifier
Comp1_Questionidentifier
Comp2_QuestionOptionidentifier
Comp2_Expressionidentifier
Comp2_Value_int
Comp2_Value_str
OR_Expressionidentifier Referring to the above expression components, component 1 data retrieves the provided answers and compares it against the values stored in the component 2 using the operator data. The operator field may be, in some embodiments, a 32 bit integer which may be part value and part bitmask, and may operate like the instruction code of a microprocessor. Two bits determine which comp1 input to use (e.g., whether to use a question option identifier, an expression identifier or a question identifier) and another two bits which comp2 input to use. One bit in the Operator is used to negate the comp1 input (to allow for a Boolean NOT), and one bit to similarly negate the comp2 input. Eight bits of the Operator may be used to represent the actual operation (less than, higher than, equals, AND, OR etc.) used for each expression component. The remaining bits may be available for other use.

In order to connect or associate multiple components together using an "AND" logical association, multiple expression components are provided. To use an "OR" one or more expression components together, the second expression component is assigned its own expression identifier and the OR expression identifier entry is used to identify another expression identifier to connect such items. When determining if a particular question answer affects any expressions, expressions may be joined using comp1_QuestionOptionidentifier and comp2_QuestionOptionidentifier, or other field identifying question options. If a sub expression in an OR operation is used, a root expression identifier may be used to determine an expression identifier that may have changed.

Based on the stored question answers, a user profile, and the expressions, recommendations are provided. The recommendation tables 70 include a recommendations table and a recommendation categories table. The recommendation table may include the following fields: recommendation identifier (which may serve as the primary key for the table); recommendation category identifier, which links to a record or records in the recommendations category table; recommendation text; expression identifier; recommendation importance, or other field. The expression identifier may link to one or more expressions in the expression tables 65. When the expression with the expression identifier becomes true or other value is presented (e.g., an integer, string value, or other value), then a recommendation is triggered. The recommendation importance field is used, in some embodiments, to attach levels of importance attached to a recommendation. These could be, for example, critical, major, normal, and low, or other level, and are used for display purposes.

In some embodiments, recommendations can be grouped into categories. The recommendation categories table contains the fields such as a recommendation category identifier (which may serve as the primary table key and may link to records in the recommendations table), category title, category description, category scope bitmask, or other field. The data in the category title and category description fields may be used to create a user readable report. If one or more recommendations become triggered to an active state because its associated or linked expression becomes true or other appropriate value, a header and description of the category could be placed in front of the recommendations, for example for a report that is printed at a printer, emailed in an html document, or otherwise provided to a user.

The category scope bitmask may be used to limit a recommendation, for example, to avoid overwhelming user with multiple recommendations. For example, if a user has three profiles in one profile type A and two profiles in another profile type B, and would like a list of generic recommendations all profile types, then very specific recommendations for a particular profile might not be of interest to such a user. If, however, a recommendation for one or more profiles triggers a recommendation which would recommend that some global option is required, then all recommendations may be displayed. There are generally several bits for the scope of a recommendation, including:

Always show this recommendation
Show this recommendation when getting recommendations for a profile type
Show this recommendation when getting a recommendations on a profile level.

The data in the static tables 25 may be edited by a user such as an administrator, and may be restricted to certain authorized users, e.g., a person having access to the backend. This allows users to modify any aspect of the decision making tree without having to rewrite source code or otherwise engage in programming. For example, new questions may be added by simply adding appropriate entries in the questions table. Navigation among questions may be easily changed by editing the relevant navigation entries in the question navigations table. The nature of the recommendations to be given may be changed through edits to the recommendations tables 70, and how answers are used may be changed by editing the expressions tables 65. This provides a flexible, easy to use architecture for controlling and customizing a decision making process.

As discussed above, the dynamic tables 30 are used by the backend application 15 to store data needed during a decision making session. In some embodiments, there are cour dynamic tables. The question history table 75 contains fields, such as question history identifier (which may serve as the primary key for the table), profile identifier, section identifier, stack identifier, question identifier, or other field. The backend application 15 keeps track of the current question through the question identifier and the profile linked to that question through the profile identifier, or other table entry. The stack identifier may link the question stack table 85, as explained further below.

The answer table 80 has the following fields: answer identifier (which may serve as the primary key), question option identifier, profile identifier, value integer, value string, option state, or other field. The question stack table 85 may be used to store called questions. Its fields include stack identifier, profile identifier, parent stack identifier, navigation identifier, part, history, history identifier, or other field. The use of these fields is explained in detail below with reference to the processes for navigating among questions and making recommendations as illustrated in FIGS. 3-7.

Figure 3:
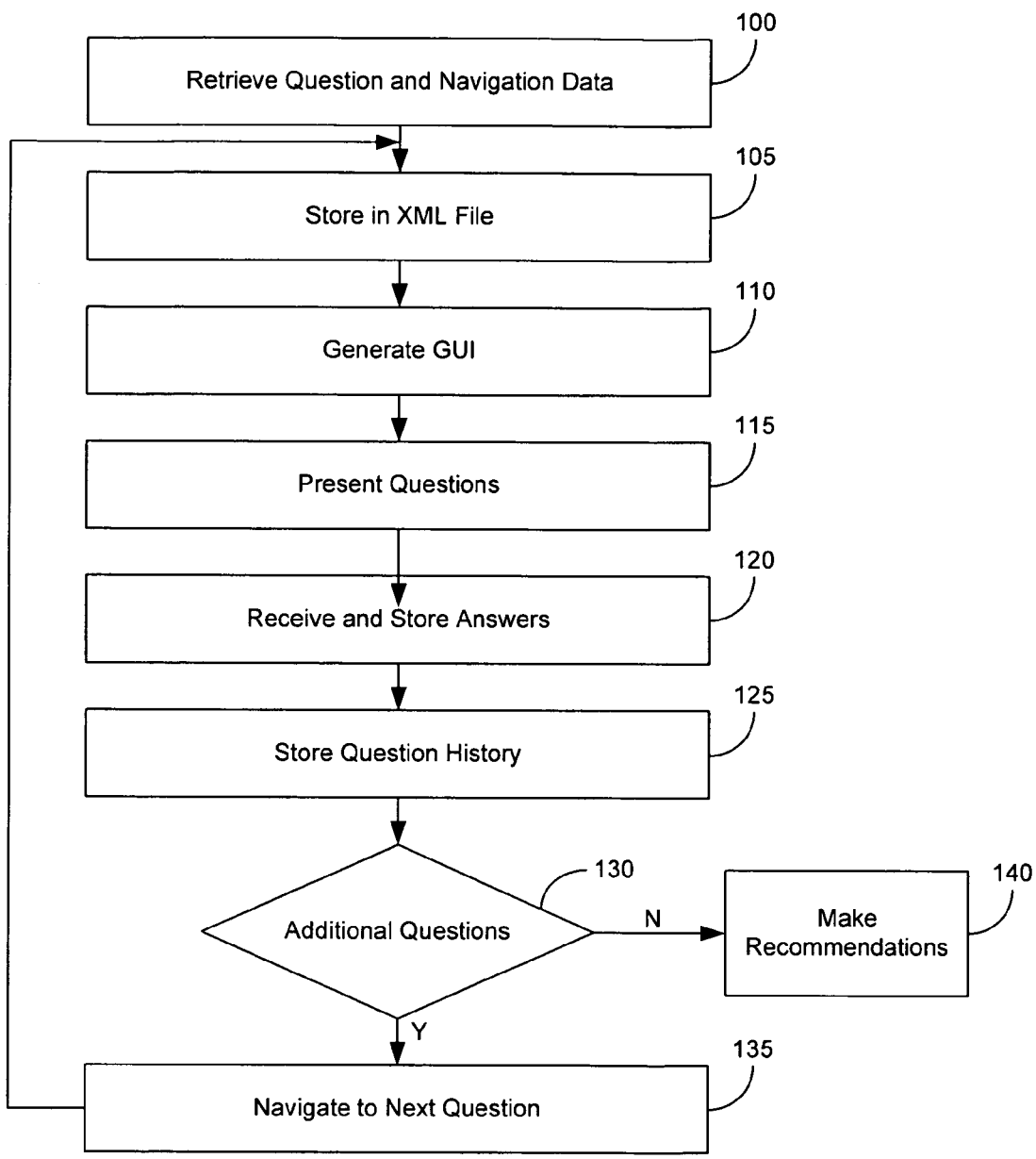
FIG. 3 is a flow chart showing a process for generating and navigating a decision tree in accordance with one embodiment of the present invention.

Referring, then, to FIG. 3, a process in accordance with the present invention of generating and presenting questions starts by retrieving question and navigation data, step 100. As discussed above, the question and navigation data may be stored in static relational database tables, or other database table, and, in some embodiments, the questions retrieved are selected in accordance with a specific profile of elements or objects which are the subject of the decision, or in accordance with a user's profile. The questions retrieved may include all questions in a given decision tree or a first set of questions which, as determined from the navigation data, are not dependent upon the answers provided. The retrieved questions are stored in a file or an XML file, step 105, along with the appropriate tags to label the questions. The navigation data may also be stored in the XML file, in some embodiments.

The XML file is then handed off to another application which generates a GUI to present the questions and, if available, the navigation data, step 110. Alternatively, a file may be transmitted using one or more sockets to a front end to generate a GUI. The application generates the GUI and presents the questions, step 115. Users provide answers to the questions through the GUI, step 120. The answers are stored and the question presented is recorded as part of the question history, step 125. The next question to present, if any, is determined, step 130, either from the XML file or by the backend application consulting the question navigation data. As explained above, in some embodiments the question navigation data references an expression to be evaluated based on received answers and decides which question to select based on whether the expression evaluates to a value of true or false, an integer value, string value or other value. If the question navigation data contains one or more call questions, those call questions may be pushed to the question stack table and become the next questions to be asked. In addition, the current history identifier of the calling question, the parent stack identifier and the profile identifier may be stored in the question stack table. After the call question or questions pushed on the stack are presented and answered, navigation returns to the same point, e.g., the same record in the question navigation table, and further questions, e.g., jump questions, may be selected to be presented next, depending upon the value of the expression linked by the expression identifier.

The outcome of this navigation process is to proceed to the next question in the decision tree, step 135. The process of presenting questions, receiving answers and making navigation decision iterates until all questions in the tree are exhausted, e.g., the navigation data for a given question indicates it is the last question to be presented. When that happens, the backend application retrieves the recommendations to be made, step 140, based on the answers provided.

In accordance with advantageous aspects of the present invention, a user may, at any point during a decision making session, select a question to answer other than the then—currently presented question. In some embodiments, this is done by showing the user through the GUI the decision tree that he has traversed during the session, by adding each question to the tree as it is presented. The user may then interact through the GUI to select a question previously presented. This would be done by the user for a number of reasons, such as because the user realized he provided incorrect or incomplete answers to questions, the answers to the question have changed due to changes in system configuration or the like, or because answers to certain questions were unavailable at an earlier time or were otherwise not provided.

Figure 4:
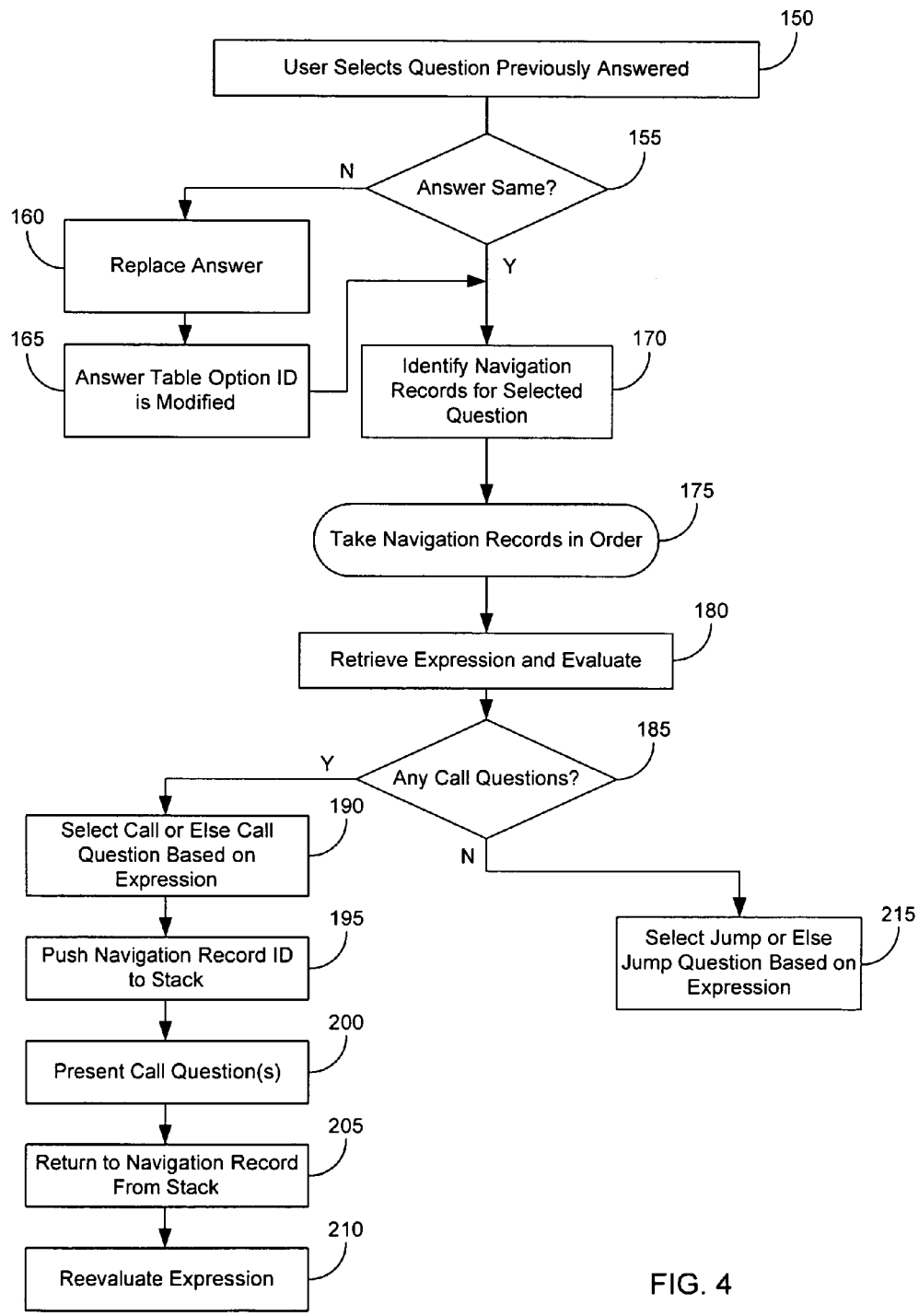
FIG. 4 is a flow chart illustrating a process for navigating in a decision tree when a user selects a question that has already been answered, in accordance with one embodiment of the present invention.

FIG. 4 illustrates one embodiment of a process for navigating a decision tree once a user has requested a question previously answered. The user selects the question, step 150, through any known interaction such as mouse clicking on an object representing the question on a display or typing in data identifying the question. Next, a check is made to determine whether there were previous question answers for the same question, step 155. This is done, in some embodiments, by querying the answers table described above. In case there are previous answers, these are removed and replaced with the current answer(s), step 160, by updating the appropriate record in the answers table. In addition, the record in the answers table is modified to indicate which question option identifiers changed as a result of the new answer, step 165. This helps determine which expressions might be affected by the changed answer.

Next, the navigation data is checked to determine which question(s) to navigate to next based on the selected question and answer provided. This is done, in some embodiments, by querying the question navigation table to locate all records in which the question identifier to which to navigate matches the question identifier of the selected question, step 170. For each such record, checked in order of a navigation identifier, step 175, the expression identifier is retrieved and the corresponding expression in the expression table evaluated to either true or false or other value, step 180, based on the updated question option identifiers in the answers table.

If the question navigation table record has any call questions identified, step 185, the call question identified by the call question identifier or the alternative call question identified by the call question identifier is selected based on whether the expression is true or false or other value, respectively, step 190. Whichever call question is selected, the navigation identifier and data identifying whether the call question is the else call question or not, is stored in the question stack table, step 195. The call question or questions identified are then presented in sequence to the user, step 200. Once the call questions are finished being presented and answers are received, navigation returns to the record in the question navigation table having the navigation identifier pushed to the stack, step 205. Then, the expression identified by the navigation table record is reevaluated, step 210, to determine whether the answers received from the call question changed the expression. Depending upon the value of the expression, navigation control then jumps to the question given in either the jump question identifier (when the expression is true or some other preset value), or jump to the question identified by the else jump question identifier, step 215 (e.g., when the expression is false or other preset value). If an expression is false but no jump or call questions exist, then the next row in the question navigation table is checked.

Figure 5:
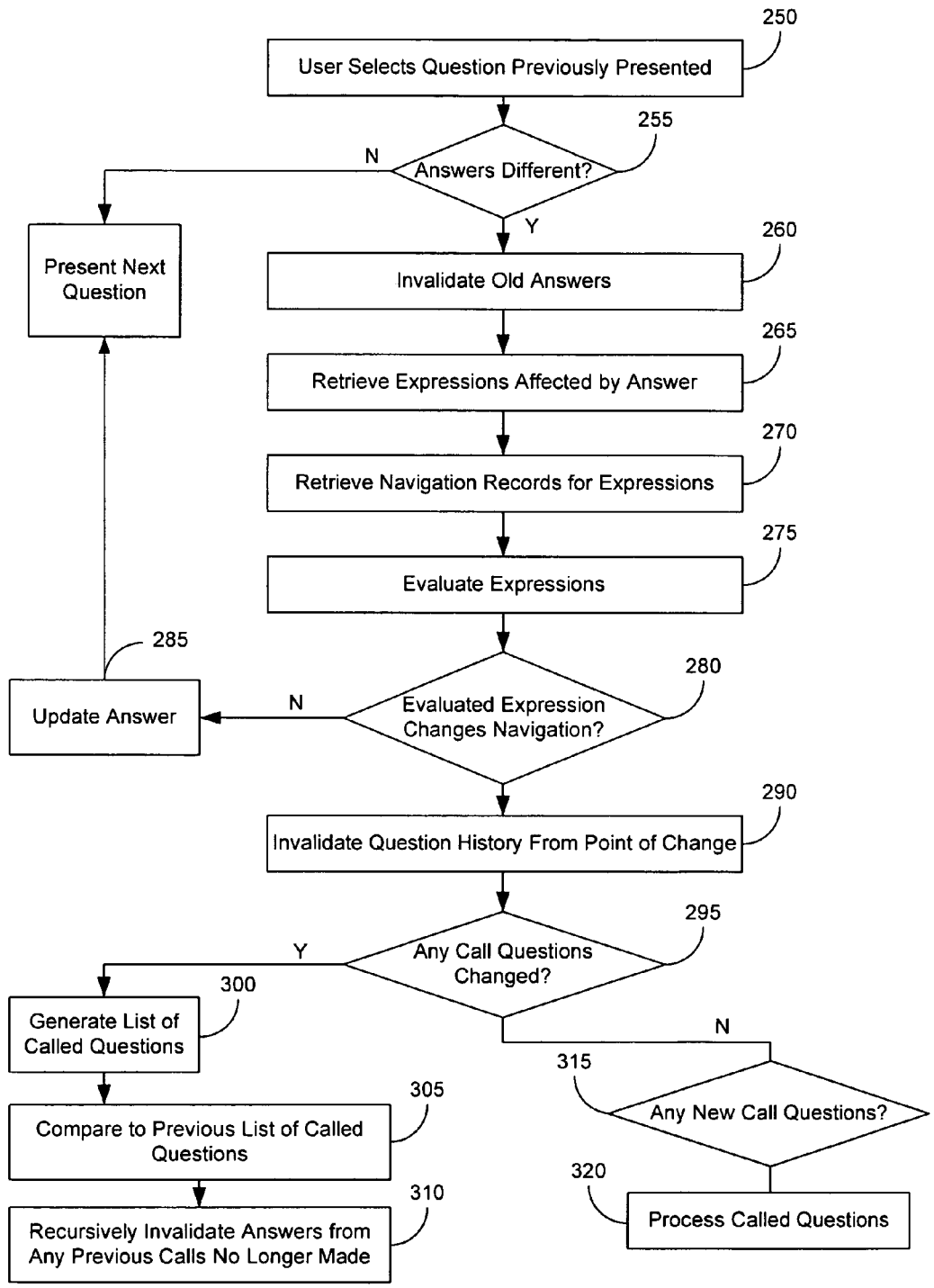
FIG. 5 is a flow chart illustrating a process for generating a revised decision tree in response to a user selecting a question previously traversed, in accordance with one embodiment of the present invention.

Question navigation may get more complicated if a user answered some questions and then went back to do questions over which would cause a different question navigation/decision making tree. FIG. 5 illustrates an alternative process for navigating which includes building a revised decision tree based on a user selecting to answer a question already answered or for which no answer was previously provided. First, the user selects the previously presented question in the decision tree, step 250, in the fashion described above. When the question is answered, it is first determined if answers have changed, step 255. If yes, then the old question answers are invalidated, step 260, by, in some embodiments, deleting those records from the answers table. A list of expressions which could possibly be affected by this question answer change is generated, step 265, by, in some embodiments, querying the expressions table for the relevant question identifiers.

All question navigation rows which use a potentially affected expression and which also affect any question navigation within the current question stack are then retrieved, step 270, and the expressions are reevaluated in order of a question history identifier, step 275. If the evaluation of expressions does not result in a change in navigation, step 280, the question history identifier may remain the same and the answers are updated, accordingly, step 285. If, however, any question navigation changes, then the question history in the current stack is invalidated from that point onwards, step 290.

In the case of a call question being changed, step 295, the entire list of called questions from a question is generated, step 300, and compared against the previous list of called questions, step 305, which, in some embodiments, is stored in the question stack. If a previous call question is no longer made, then the answers given to that call question are recursively invalidated, step 310. In some embodiments, that includes invalidating answers to call questions no longer made as well as any answers provided to questions presented based on the answers given to call questions no longer made. The process for determining which answers are affected is the same as one used in generating the decision tree, as described above. If a new call question is made from the current question, step 315, then the first new call question is the next question presented to the user, step 320, by adding that call question to the question stack. If a call question becomes active that was not active previously below a question which is not currently the active question, then a stack and history entry is created, but the next question is determined based on the current question.

After this, the next question to be displayed to the user is determined, step 325. In case of multiple calls, the first uncalled call question will be the next question identifier. If all calls were already made, the first call will be the next question identifier. If there are no calls at all, then the next question displayed is the next one in the question history for the current stack. If no entry exists in the question history table, the question navigation table may be consulted and the next question determined.

As a result, a new decision tree is automatically generated based on any question selected by a user to be presented and any answer provided. This is made possible by the discrete storage of storing questions, navigation logic, answers, expressions and other data in separate, easily editable tables, and the use of a backend application to process and reprocess this data.

Figure 6:
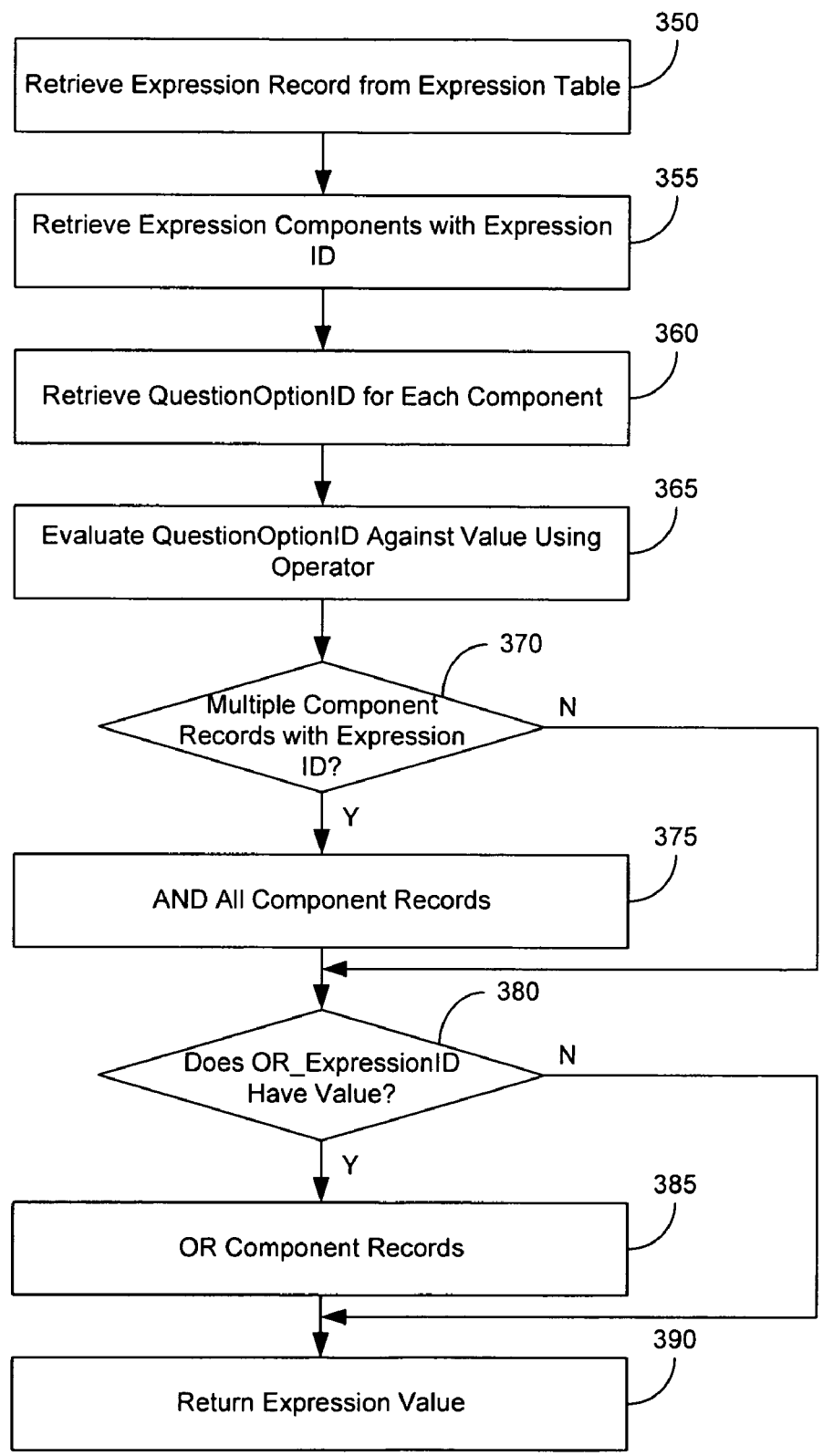
FIG. 6 is a flow chart illustrating a process for evaluating expressions based on answers received, in accordance with one embodiment of the present invention.

The processes of generating a decision tree, updating the decision tree, and making recommendations all rely on the evaluation of expressions. The data structures used in some embodiments to store expressions were described above. A process for evaluating expressions is illustrated in FIG. 6. Based on an expression identifier retrieved from another of the tables, the expression record is retrieved from the Expression table, step 350. The expression identifier is also used to identify and retrieve one or more records from the expression component table, step 355.

For each record in the expression component table retrieved, the expression components are evaluated by, in some embodiments, retrieving the identified question option identifier identified for each component from the answer table, step 360, and evaluating the retrieved data against the value stored in the other expression component using a comparator identified in the operator data field, step 365. The result is a value of true or false for the expression component. If there are multiple expression components having the expression identifier, step 370, the logical values of each evaluated expression component are combined by a Boolean AND operation, step 375. If an OR Boolean expression identifier field in a given expression component has a value, step 380, the expression component is combined with the evaluated expression component matching the OR expression identifier by a Boolean OR operation, step 385. The resulting logical value is returned to whatever process was requesting it, step 390.

Figure 7:
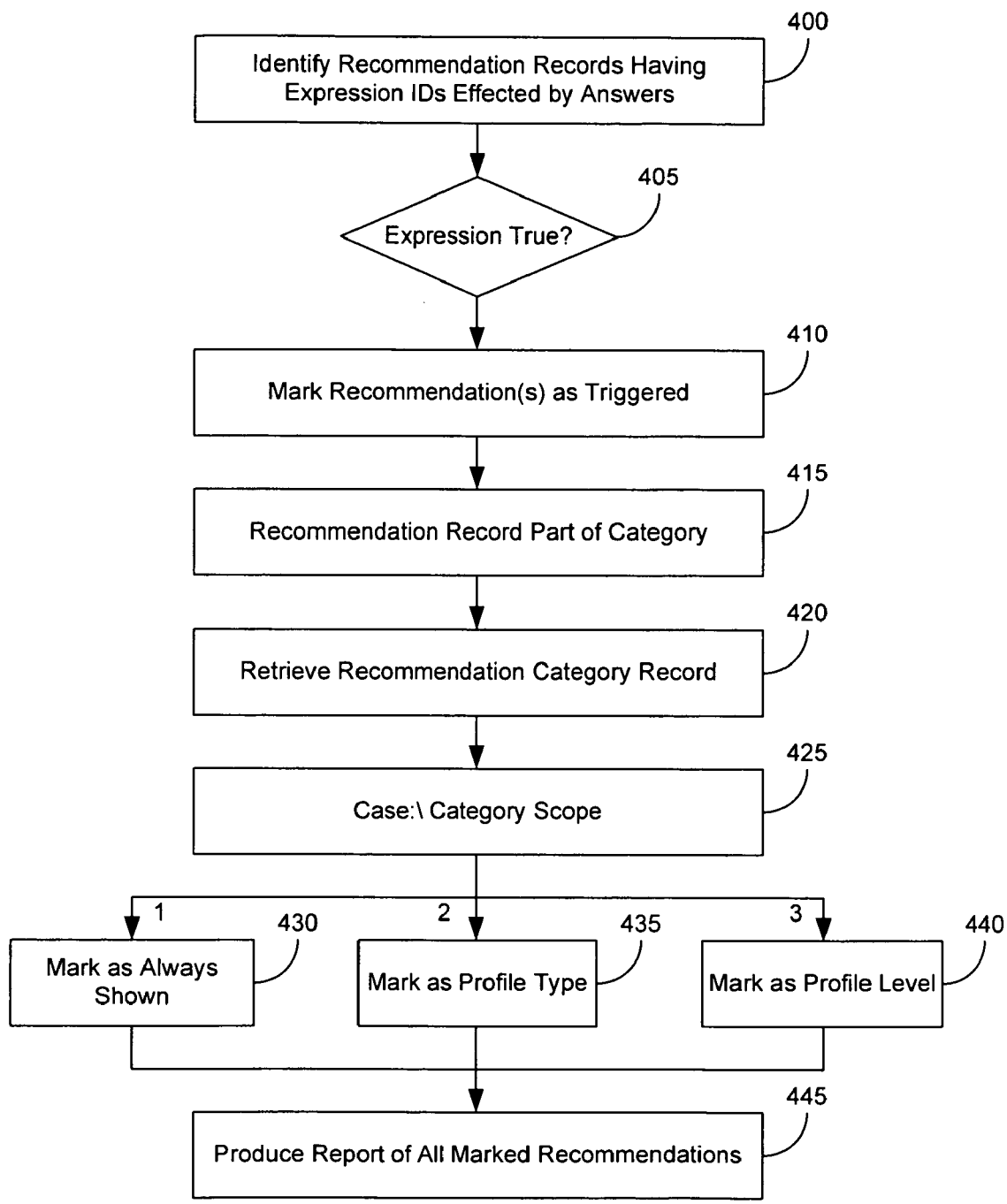
FIG. 7 is a flow chart illustrating a process for making recommendation based on answers received, in accordance with one embodiment of the present invention.

One process which relies on expressions being evaluated is the process of making decisions or recommendations based on the provided answers. Recommendations may be provided at any point during a decision making session, based on whatever questions have been answered to that point. Also, in some embodiments, a user may request a recommendation for elements or objects having a certain profile type or profile level, identified in the profile tables, as described above. A process for making recommendations is illustrated in FIG. 7. When a recommendation is requested, all recommendation records in the recommendations table having expression identifiers affected by stored answers are retrieved, step 400. If the expression is true, step 405, the recommendation record or records having that expression are marked as triggered, step 410. Those recommendation records are checked to determine whether they are part of a recommendation category, step 415. If it is, the identified recommendation category record is retrieved, step 420, from the recommendations category table. The recommendation category stores a category scope bitmask field, as explained above, which is given one of three values for the recommendation. The value for this field is retrieved, step 425. Depending on the value, the recommendation is marked as always shown, step 430, shown for an identified profile type, step 435, or shown for an identified profile level, step 435. Finally, a report is produced showing all recommendations which have been marked, step 440. The report includes the recommendation text, recommendation importance, and category title and description, as available.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method performed by a recommendation system for facilitating decision making with respect to software systems by presenting questions to and receiving answers from a user, the method comprising:

storing in a computer readable medium of the recommendation system one or more user-editable question tables containing a plurality of questions and navigation logic data for navigating between questions;

maintaining one or more dynamic tables containing question history data identifying which of the questions have been presented in a decision making session and answer data identifying answers received from the user;

at a given point in a decision making session, determining which one or more questions to present based on the question history data and the navigation logic data;

generating a structured document containing the one or more questions determined to be presented;

generating a user interface using the structured document for presenting the one or more questions and receiving the answers; and providing to the user or other users for display via a display device the generated user interface;

wherein storing one or more user-editable question tables comprises storing a first table containing the plurality of questions and a second table containing the navigation logic data.

2. The method of claim 1, wherein storing the first table comprises storing profile link data identifying groups of entities to which questions relate.

3. The method of claim 1, further comprising storing a third table containing expression data including a plurality of expression data components and one or more expression operators linking the expression data components, the expression data evaluating an expression as true or false based on any of the answers.

4. The method of claim 1, wherein storing one or more user-editable question tables comprises storing, in the navigation logic data, jump question data identifying one or more jump questions to be presented after a given question and call question data identifying one or more questions to be presented before the given question.

5. The method of claim 1, further comprising computing a recommendation based on the received answers, wherein the questions relate to a configuration of a network and wherein computing the recommendation comprises computing a recommended installation of one or more software programs to be installed on the network.

6. The method of claim 1, further comprising maintaining the one or more dynamic tables during a decision making session by updating the question history data based on questions presented and answers received during the session.

7. The method of claim 2, wherein maintaining one or more dynamic tables comprises maintaining separate question history data for different groups of entities based on the profile link data.

8. A computer readable medium storing program code which when executed on a computer, causes the computer to perform a method for facilitating decision making by presenting questions to and receiving answers from a user, the method comprising:

storing one or more user-editable question tables containing a plurality of questions and navigation logic data for navigating between questions;

maintaining one or more dynamic tables containing question history data identifying which of the questions have been presented in a decision making session and answer data identifying answers received from the user;

at a given point in a decision making session, determining which one or more questions to present based on the question history data and the navigation logic data;

generating a structured document containing the one or more questions determined to be presented; and generating a user interface using the structured document for presenting the one or more questions and receiving the answers, wherein storing one or more user-editable question tables comprises storing a first table containing the plurality of questions and a second table containing the navigation logic data.

9. The method of claim 8, wherein storing the first table comprises storing profile link data identifying groups of entities to which questions relate.

10. The method of claim 8, further comprising storing a third table containing expression data including a plurality of expression data components and one or more expression operators linking the expression data components, the expression data evaluating an expression as true or false based on any of the answers.

11. The method of claim 8, wherein storing one or more user-editable question tables comprises storing, in the navigation logic data, jump question data identifying one or more jump questions to be presented after a given question and call question data identifying one or more questions to be presented before the given question.

12. The method of claim 8, comprising computing a recommendation based on the received answers, wherein the questions relate to a configuration of a network and wherein computing the recommendation comprises computing a recommended installation of one or more software programs to be installed on the network.

13. The method of claim 8, further comprising maintaining the one or more dynamic tables during a decision making session by updating the question history data based on questions presented and answers received during the session.

14. The method of claim 9, wherein maintaining one or more dynamic tables comprises maintaining separate question history data for different groups of entities based on the profile link data.

15. The method of claim 10, wherein storing the second table comprises storing a link in the second table to an expression data entry in the third table, and wherein determining which one or more questions to present comprises determining whether the expression corresponding to the linked expression data entry evaluated to true or false.

16. A recommendation system for facilitating decision making, the system comprising: a computer-readable medium storing a database, wherein the database contains:

two or more user-editable question tables that contain a plurality of questions and navigation logic data for navigating between questions, wherein a first table contains the plurality of questions and a second table containing the navigation logic data; one or more dynamic tables that contain question history data identifying which of the questions have been presented in a decision making session and answer data identifying answers received from the user;

a determination component, wherein the determination component is configured to determine one or more questions to present based on the question history data and the navigation logic data;

a document generation component, wherein the document generation component is configured to generate a structured document containing the one or more questions determined to be presented; and an interface generation component, wherein the interface generation component is configured to generate a user interface using the structured document for presenting the one or more questions and receiving the answers.

17. The recommendation system of claim 16, wherein the first table comprises profile link data identifying groups of entities to which questions relate.

18. A recommendation system for facilitating decision making, the system comprising:

a means for storing one or more user-editable question tables containing a plurality of questions and navigation logic data for navigating behween questions;

a means for maintaining one or more dynamic tables containing question history data identifying which of the questions have been presented in a decision making session and answer data identifying answers received from the user; a means for determining which one or more questions to present based on the question history data and the navigation logic data;

a means for generating a structured document containing the one or more questions determined to be presented; and a means for generating a user interface using the structured document for presenting the one or more questions and receiving the answers, wherein storing one or more user-editable question tables comprises storing a first table containing the plurality of questions and a second table containing the navigation logic data.

19. The recommendation system of claim 18, further comprising a means for maintaining the one or more dynamic tables during a decision making session by updating the question history data based on questions presented and answers received during the session.

* * * * *

UNITED STATES PATENT AND TRADEMARK OFFICE
CERTIFICATE OF CORRECTION

| | | |
|---|---|---|
| PATENT NO. | : 7,457,790 B2 | Page 1 of 1 |
| APPLICATION NO. | : 11/313268 | |
| DATED | : November 25, 2008 | |
| INVENTOR(S) | : Kochunni et al. | |

It is certified that error appears in the above-identified patent and that said Letters Patent is hereby corrected as shown below:

In column 1, line 45-46, delete "reproducton" and insert -- reproduction --, therefor.

In column 10, line 14, delete "cour" and insert -- four --, therefor.

In column 16, line 4-14, in Claim 16, after "comprising:" delete "a computer-readable.....from the user;" and insert the same on Col. 16, Line 5 below "comprising:".

In column 16, line 34, in Claim 18, delete "behween" and insert -- between --, therefor.

In column 16, line 55, below "session." insert -- 20. The method of claim 6, wherein storing the second table comprises storing a link in the second table to an expression data entry in the third table, and wherein determining which one or more questions to present comprises determining whether the expression corresponding to the linked expression data entry evaluated to true or false. --.

Signed and Sealed this

Seventeenth Day of February, 2009

JOHN DOLL
*Acting Director of the United States Patent and Trademark Office*